US011156206B2

(12) United States Patent
Melius et al.

(10) Patent No.: US 11,156,206 B2
(45) Date of Patent: Oct. 26, 2021

(54) SYSTEM AND METHOD FOR APPLYING A PITCH MOTOR BRAKING TORQUE TO A WIND TURBINE ROTOR BLADE

(71) Applicant: General Electric Company, Schenectady, NY (US)

(72) Inventors: Jeffrey Alan Melius, Roanoke, VA (US); Michael Lawton Rodin, Salem, VA (US); Fernando Arturo Ramirez Sanchez, Salem, VA (US)

(73) Assignee: General Electric Company, Schenectady, NY (US)

( * ) Notice: Subject to any disclaimer, the term of this patent is extended or adjusted under 35 U.S.C. 154(b) by 99 days.

(21) Appl. No.: 16/750,572

(22) Filed: Jan. 23, 2020

(65) Prior Publication Data
US 2021/0231100 A1  Jul. 29, 2021

(51) Int. Cl.
 *F03D 7/02* (2006.01)
(52) U.S. Cl.
 CPC ......... *F03D 7/0224* (2013.01); *F03D 7/0244* (2013.01)
(58) Field of Classification Search
 CPC .............................. F03D 7/0224; F03D 7/0244
 See application file for complete search history.

(56) References Cited

U.S. PATENT DOCUMENTS

| 2010/0135791 A1 | 6/2010 | Melius |
| 2013/0271056 A1* | 10/2013 | Bunte ..................... H02P 27/06 318/503 |
| 2017/0328343 A1 | 11/2017 | Melius et al. |

FOREIGN PATENT DOCUMENTS

| DE | 102004005169 B3 | 11/2005 |
| EP | 2919379 A1 | 9/2015 |

OTHER PUBLICATIONS

European Search Report for EP Application No. 21151044.1, dated Jun. 11, 2021.
Rosmann, Tobias et al., Analysis of Instability of Direct Powered DC-Compound Machines in Pitch Systems of Large Wind Turbines, 2010 IEEE International Conference, Mar. 14, 2010, p. 323-329.

* cited by examiner

*Primary Examiner* — Viet P Nguyen
(74) *Attorney, Agent, or Firm* — Dority & Manning, P.A.

(57) ABSTRACT

A system and method are provided for applying a pitch motor braking torque to a rotor blade. Accordingly, of the pitch control system from a $1^{st}$ operational mode to an emergency operational mode is initiated. The pitch motor of the pitch control system having an absence of supply current during the transition. A short-circuit is established across the Armature of the pitch motor so as to establish a current flow. The current is generated by the pitch motor in response to rotation of the rotor blade about the pitch axis when the pitch motor has the absence of supply current. In response to the current flow being generated, generating a braking torque in a single direction with the pitch motor so as to allow the rotor blade to move freely to a lesser loaded orientation relative to an original orientation to protect the wind turbine from damage.

20 Claims, 6 Drawing Sheets

SYSTEM AND METHOD FOR APPLYING A PITCH MOTOR BRAKING TORQUE TO A WIND TURBINE ROTOR BLADE

FIELD

The present disclosure relates in general to wind turbines, and more particularly to systems and methods for applying a pitch motor braking torque to a rotor blade of the wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

Typically, the rotor blades are rotated or pitched about a pitch axis via a pitch control system that is driven by a pitch motor which is powered by a pitch power converter. However, in various scenarios, such as a failure of the pitch power converter, it may be necessary to power the pitch control system via an alternate energy source. During the transition from the pitch power converter to the alternate energy source, there may be a period during which there is no torque applied by the pitch motor. As such, gravity and/or inertia may cause an uncontrolled rotation of the rotor blade to an undesirable loaded orientation. This, in turn, may result in an overloaded condition of the rotor blade, thereby leading to component and/or wind turbine failure.

In addition to the overloaded condition, the uncontrolled rotation of the rotor blade to undesirable loaded orientation may also result in the pitch motor generating an electric current. This electric current may flow to the alternate energy source and interfere with the powering of the pitch control system by the alternate energy source. As such, it may be desirable to control the rotation of a rotor blade while transitioning between the pitch power converter and the alternate energy source.

Thus, the art is continuously seeking new and improved systems for restricting the uncontrolled rotation of the rotor blade to an undesirable loaded orientation while transitioning to the alternate energy source. Accordingly, the present disclosure is directed to systems and methods for applying a pitch motor braking torque to the rotor blade.

BRIEF DESCRIPTION

Aspects and advantages of the invention will be set forth in part in the following description, or may be obvious from the description, or may be learned through practice of the invention.

In one aspect, the present disclosure is directed to a method for applying a pitch motor braking torque to a rotor blade of a wind turbine. The wind turbine may include a pitch control system operably coupled to the rotor blade for rotating the rotor blade about a pitch axis. The method may include initiating a transition of the pitch control system from a first operational mode to an emergency operational mode. The pitch motor of the pitch control system may have an absence of an supply current during the transition. The method may also include establishing a short-circuit across an armature of the pitch motor so as to establish a current flow between a first terminal and a second terminal of the pitch motor. The current flow may be generated by the pitch motor in response to a rotation of the rotor blade about the pitch axis when the pitch motor has the absence of supply current. In response to the current flow being generated, the method may also include generating a braking torque in a single direction with the pitch motor so as to allow the rotor blade to move freely to a lesser loaded orientation to protect the turbine from damage.

In an embodiment, the rotation of the rotor blade is a pitch-to-power rotation.

In an additional embodiment, generating the braking torque in the single direction may resist the pitch to power rotation of the rotor blade, and the movement to a lesser loaded orientation may include a pitch-to-feather rotation of the rotor blade.

In an embodiment, establishing the short-circuit across the armature the pitch motor may also include blocking, via a unidirectional switch, the current flow path from the first terminal to the second terminal.

In an additional embodiment, initiating the transition of the pitch control system may include opening a contactor operably coupling the pitch motor to a power converter of the pitch control system. Opening the contactor may also initiate a power flow from an alternate energy source to the unidirectional switch.

In a further embodiment, the unidirectional switch may be an electro-mechanical switch.

In an embodiment, the unidirectional switch may be an electronic switch. In such embodiments, for example, the electronic switch may include a silicone controlled rectifier operably coupled to a gate driver circuit.

In an embodiment, the method may also include implementing the transition of the pitch control system from the first operational mode to the emergency operational mode by operably coupling the pitch motor to the alternate energy source.

In an embodiment, establishing the short-circuit across the armature of the pitch motor may also include operably coupling a first lead of the unidirectional switch to the first terminal of the pitch motor. The method may also include operably coupling a second lead of the unidirectional switch to a series field of the pitch motor. Coupling to the series field may establish a variable braking torque which increases with a torque resulting from the rotation of the rotor blade.

In another aspect, the present disclosure is directed to a system for applying a pitch braking torque to a rotor blade of a wind turbine via a pitch control system. The pitch control system may include a pitch motor of the pitch control system operably coupled to the rotor blade of the wind turbine. The pitch motor may have an absence of supply current during a transition from a first operational mode of the pitch control system to an emergency operational mode of the pitch control system. The system may include a first coupling between the pitch motor and a pitch power converter when the pitch control system is in the first operational mode. Opening the first coupling may initiate a transition of the pitch control system from the first operational mode to the emergency operational mode. The system may also include a second coupling between the pitch motor and an alternate energy source when the pitch motor is in the emergency operational mode. Additionally, the system may include a short-circuit across an armature of the pitch motor. The short-circuit may establish a current flow between a first terminal and a second terminal of the pitch motor. The current flow may be generated by the pitch motor in response to a rotation of the rotor blade about the pitch axis when the pitch motor has the absence of supply current. The pitch motor may be configured to generate a braking torque in a single direction in response to the current generated by the rotation of the rotor blade. The braking torque may permit the rotor blade to move freely to a lesser loaded orientation to protect the rotor blade from damage. It should be understood that the system may further include any of the additional features described herein.

In another aspect, the present disclosure is directed to a method for applying a unidirectional pitch motor braking torque to a rotor blade of a wind turbine. The wind turbine may have a pitch control system operably coupled to the rotor blade for rotating the rotor blade about a pitch axis. The method may include rotating the rotor blade about the pitch axis in a pitch-to-power. The method may also include opening a contactor operably coupling a pitch motor of the pitch control system to a pitch power converter to initiate a transition of the pitch control system from a first operational mode to an emergency operational mode. Additionally, the method may include establishing a unidirectional short-circuit across an armature of the pitch motor. The method may further include generating, via the pitch motor, a current in response to the pitch-to-power rotation of the rotor blade. The current generated by the pitch motor may flow via the short-circuit back to the pitch motor. In response to the current generated by the pitch-to-power rotation of the rotor blade, the method may also include generating a braking torque in a single direction with the pitch motor. The braking torque may resist the pitch-to-power rotation of the rotor blade and permits a pitch-to-feather rotation of the rotor blade. It should be understood that the method may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
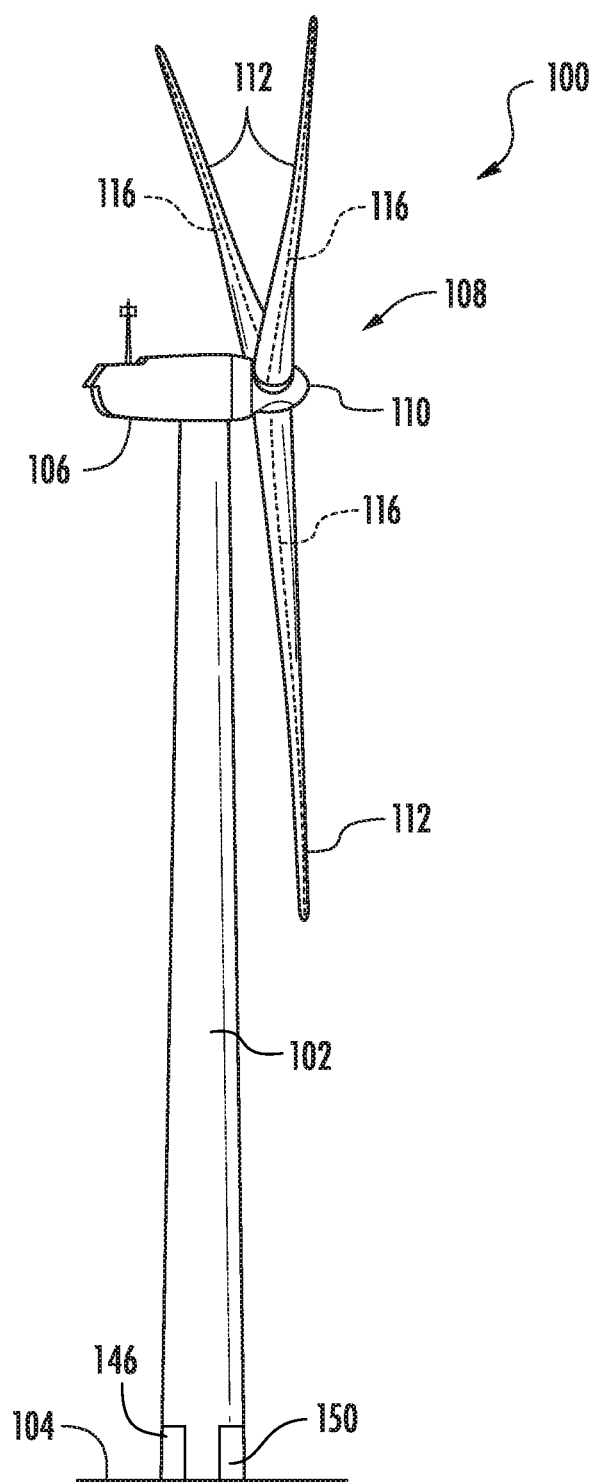
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for applying a pitch motor braking torque to a rotor blade of a wind turbine. In particular, the present disclosure includes a system and method which may resist a rotation of the rotor blade toward an undesirable loaded orientation when a pitch motor of a pitch control system is unpowered. Specifically, the present disclosure may include initiating a transition of the pitch control system from a first operational mode to an emergency operational mode. This transition may include switching the power source of the pitch control system from a pitch power converter to an alternate energy source. During the transition, no current may be flowing to the pitch motor from an external source and the pitch motor may be unable to generate a torque to control the rotation of the rotor blade about a pitch axis. As such, a short-circuit may be established across an armature of the pitch motor. The short-circuit may permit a current generated by the unpowered motor in response to the uncontrolled rotation of the rotor blade to flow back into one of at least two field windings of the pitch motor. In response to the current flow, the pitch motor may generate a braking torque in a single direction. The braking torque may resist the rotation of the rotor blade to the undesirable loaded orientation (e.g., pitch-to-power) while permitting a rotation to a lesser loaded orientation (e.g., pitch-to-feather). Resisting the rotation to a more loaded orientation, may protect the rotor blade and the wind turbine from damage due to overloading.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

Figure 2:
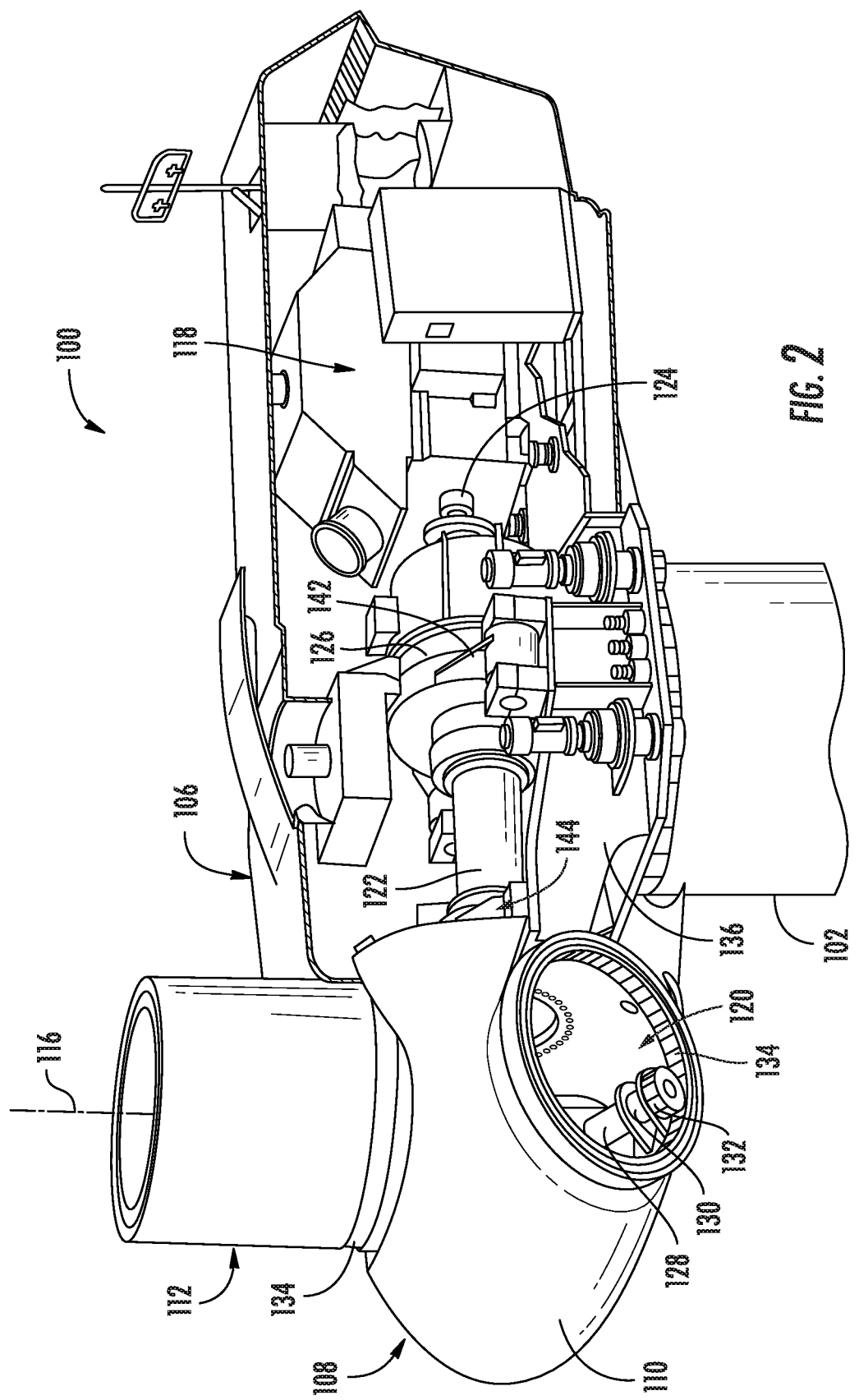
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118.

Figure 3:
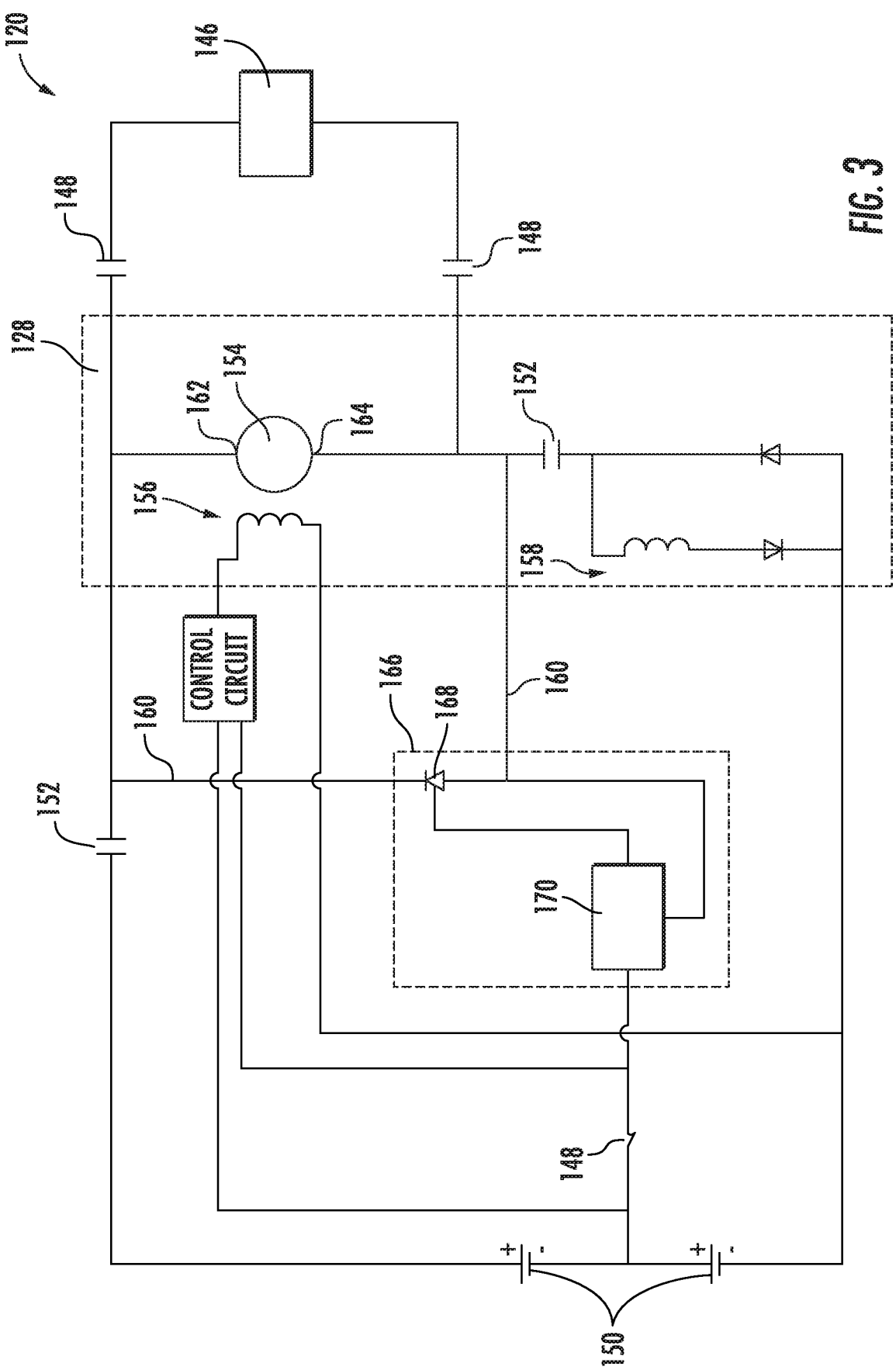
FIG. 3 illustrates a wire diagram of one embodiment of a pitch control system according to the present disclosure.
Figure 4:
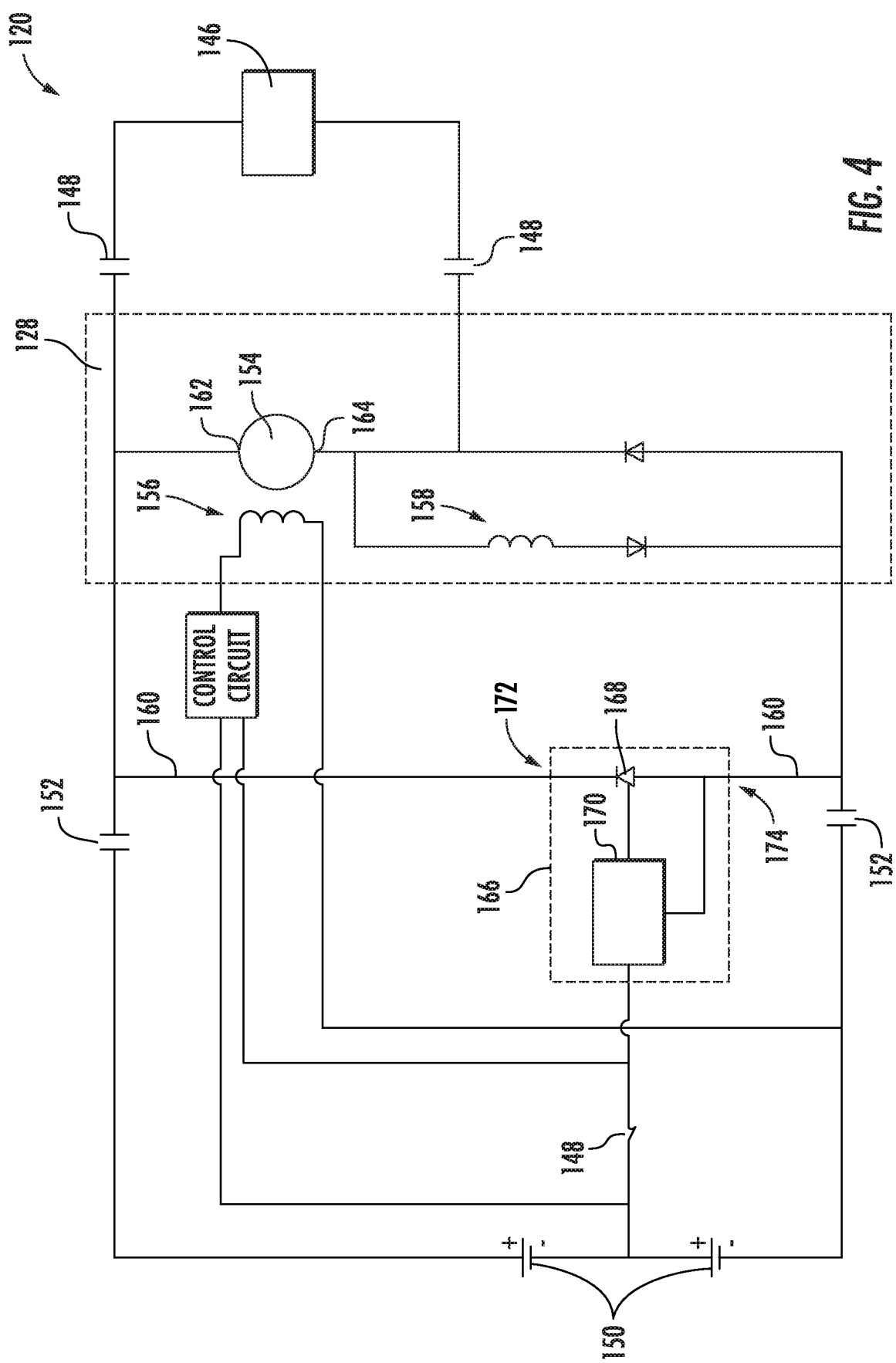
FIG. 4 illustrates a wire diagram of one embodiment of a pitch control system according to the present disclosure.

Referring now to FIGS. 2-4, in an embodiment, each rotor blade 112 may also include a pitch control system 120 configured to rotate each rotor blade 112 about its pitch axis 116. Each pitch control system 120 may also include a pitch motor 128, a pitch drive gearbox 130, and a pitch drive pinion 132. In such embodiments, the pitch motor(s) 128 may be coupled to the pitch drive gearbox(s) 130 so that the pitch motor(s) 128 imparts mechanical force to the pitch drive gearbox(s) 130. Similarly, the pitch drive gearbox(s) 130 may be coupled to the pitch drive pinion(s) 132 for rotation therewith. The pitch drive pinion(s) 132 may, in turn, be in rotational engagement with a pitch bearing 134 coupled between the hub 110 and a corresponding rotor blade 112 such that rotation of the pitch drive pinion(s) 132 causes rotation of the pitch bearing(s) 134. Thus, in such embodiments, rotation of the pitch motor(s) 128 drives the pitch drive gearbox(s) 130 and the pitch drive pinion(s) 132, thereby rotating the pitch bearing(s) 134 and the rotor blade(s) 112 about the pitch axis 116.

In an embodiment, as shown particularly in FIGS. 3 and 4, the pitch motor(s) 128 may be operably coupled to a pitch power converter 146. In at least one embodiment, the coupling between the pitch motor(s) 128 and the pitch power converter 146 may be a first coupling 148. The first coupling 148 may, in an embodiment, be a contactor, a relay, a switch, a manual controller, or any other device suitable for switching electrical power. The pitch power converter 146 delivers an supply current to the pitch motor(s) 128 when the pitch control system(s) 120 is in at least a first operational mode.

In an additional embodiment, as shown, the pitch motor(s) 128 may be operably coupled to an alternate energy source 150. In at least one embodiment, the coupling between the pitch motor(s) 128 and the alternate energy source 150 may be a second coupling 152. The second coupling 152 may, in an embodiment, be a contactor, a relay, a switch, a manual controller, or any other device suitable for switching electrical power. The alternate energy source 150 may be a battery bank, a capacitor bank, a backup generator, and/or other source of power suitable for providing an supply current to the pitch motor(s) 128 during an unavailability of the supply current from the pitch power converter 146. As such, the alternate energy source 150 delivers an supply current to the pitch motor(s) 128 when the pitch control system(s) 120 is in an emergency operational mode.

In at least one embodiment, the pitch control system(s) 120 may be transitioned from the first operational mode to the emergency mode in response to a failure associated with the supply current delivered by the pitch power converter 146. In other words, in an embodiment, a failure may reside within the pitch power converter 146 or within a power grid coupled thereto, which may necessitate the transition to the emergency mode. The transition may be initiated by opening the first coupling 148. As opening the first coupling 148 decouples the pitch motor(s) 128 from the pitch power converter 146, during the transition from the first operational mode to emergency operational mode, the pitch motor(s) 128 may have an absence of supply current. In at least one embodiment, the pitch motor(s) 128 may have an absence of supply current for greater than or equal to 50 milliseconds (ms) (e.g., greater than or equal to 100 ms). In an additional embodiment, the pitch motor(s) 128 may have an absence of supply current for less than or equal to 500 ms (e.g., less than or equal to 300 ms). In an embodiment, the transition of the pitch control system(s) 120 from the first operational mode to an emergency operational mode may be completed by operably coupling the pitch motor(s) 128 to the alternate energy source 150 via the second coupling 152.

It should be appreciated that the delay in the transition from the first operational mode to the emergency operational mode, may result in a period during which no torque is generated by the pitch motor(s) 128. In the absence of a torque provided by the pitch motor(s) 128, the rotor blade(s) 112 may freely rotate in an uncontrolled manner in response to inertia and/or external forces (e.g., gravity or wind). For example, in an embodiment wherein the rotor blade(s) 112 may be rotating about the pitch axis 116 prior to the opening of the first coupling 148, the rotor blade(s) 112 may continue the rotation due to inertia. In at least one embodiment, this rotation may be a rotation toward a more aerodynamically loaded orientation (e.g., a pitch-to-power).

Still referring to FIGS. 3 and 4, in an embodiment, the pitch motor(s) 128 may be a brushed DC motor having two field windings. One of the field windings may be a shunt field winding 156 which is excited independent of an armature 154 of the pitch motor 128. The other of the field windings may be a series field winding 158. The series field winding 158 may be excited by the current flowing through the armature 154. The excitation of the series field winding 158 may be the result of the supply current or may be the result of a current generated by the pitch motor(s) 128 in response to an uncontrolled (e.g., unintended) rotation of the rotor blade(s) 112 about the pitch axis 116.

As further depicted in FIGS. 3 and 4, the pitch control system(s) 120 may also include a short-circuit 160 across the armature 154 of the pitch motor(s) 128. The short-circuit 160 may establish a current flow between a first terminal 162 and a second terminal 164 of the pitch motor(s) 128. The current flow may be generated by the pitch motor(s) 128 in response to a rotation of the rotor blade(s) 112 about the pitch axis 116. The pitch motor may, in an embodiment, be configured to generate a braking torque in a single direction in response to the current generated by the rotation of the rotor blade(s) 112. The braking torque may permit the rotor blade(s) 112 to move freely to a lesser loaded orientation in order to protect the rotor blade(s) 112 from damage.

In an embodiment, the pitch control system(s) 120 may include a unidirectional switch 166 as an element of the short-circuit 160. The unidirectional switch 166 may be operably coupled between the first terminal 162 and the second terminal 164 of the pitch motor(s) 128. The unidirectional switch 166 may block a current flow path from the first terminal 162 to the second terminal 164, while permitting a current flow from the second terminal 164 to the first terminal 162. In an embodiment, the blocked current flow from the first terminal 162 to the second terminal 164 may be generated by the pitch motor(s) 128 in response to the rotation of the rotor blade(s) 112 toward a lesser loaded orientation (e.g., a pitch-to-feather). In an additional embodiment, the current flow which is allowed to pass through the unidirectional switch 166 from the second terminal 164 to the first terminal 162 may be generated by the pitch motor(s) 128 in response to a rotation of the rotor blade(s) 112 toward a more loaded orientation. It should be appreciated that the current flow from the second terminal 164 to the first terminal 162 may result in the pitch motor(s) 128 generating the pitch motor braking torque in a single direction while allowing the rotor blades 112 to move freely to the lesser loaded orientation. In other words, in at least one embodiment, the uncontrolled pitch-to-power of the rotor blade(s) 112 may generate the current in one coil of the pitch motor(s) 128 which, in turn, is utilized by the other coil of the pitch motor(s) 128 to generate the pitch motor braking torque to resist the pitch-to-power of the rotor blade(s) 112.

In at least one embodiment, the unidirectional switch 166 may include an electronic switch. The electronic switch may include a silicone controlled rectifier 168 operably coupled to a gate driver circuit 170. In at least one embodiment, opening the first coupling 148 upon the initiation of the transition of the pitch control system(s) 120 from the first operational mode to the emergency operational mode may initiate a power flow from the alternate energy source 150, through first coupling 148, and to the unidirectional switch 166. In other words, instantaneous with the decoupling of the pitch motor(s) 128 from the pitch power converter 146, the unidirectional switch 166 may be coupled to, and powered by, the alternate energy source 150. It should be appreciated that in at least one embodiment, the unidirectional switch 166 may be an electro-mechanical switch.

As particularly depicted in FIG. 4, in an embodiment, establishing the short-circuit 160 across the armature 154 of the pitch motor(s) 128 may include operably coupling a first lead 172 of the unidirectional switch 166 to the first terminal 162 of the pitch motor(s) 128, and operably coupling a second lead 174 of the unidirectional switch 166 2 the series field 158 of the pitch motor(s) 128. It should be appreciated that coupling the unidirectional switch 166 to the series field 158 may incorporate the series field 158 into the short-circuit 160. It should be further appreciated that incorporating the series field 158 into the short-circuit 160 may establish a variable braking torque which increases with a torque resulting from the rotation of the rotor blade(s) 112.

Figure 5:
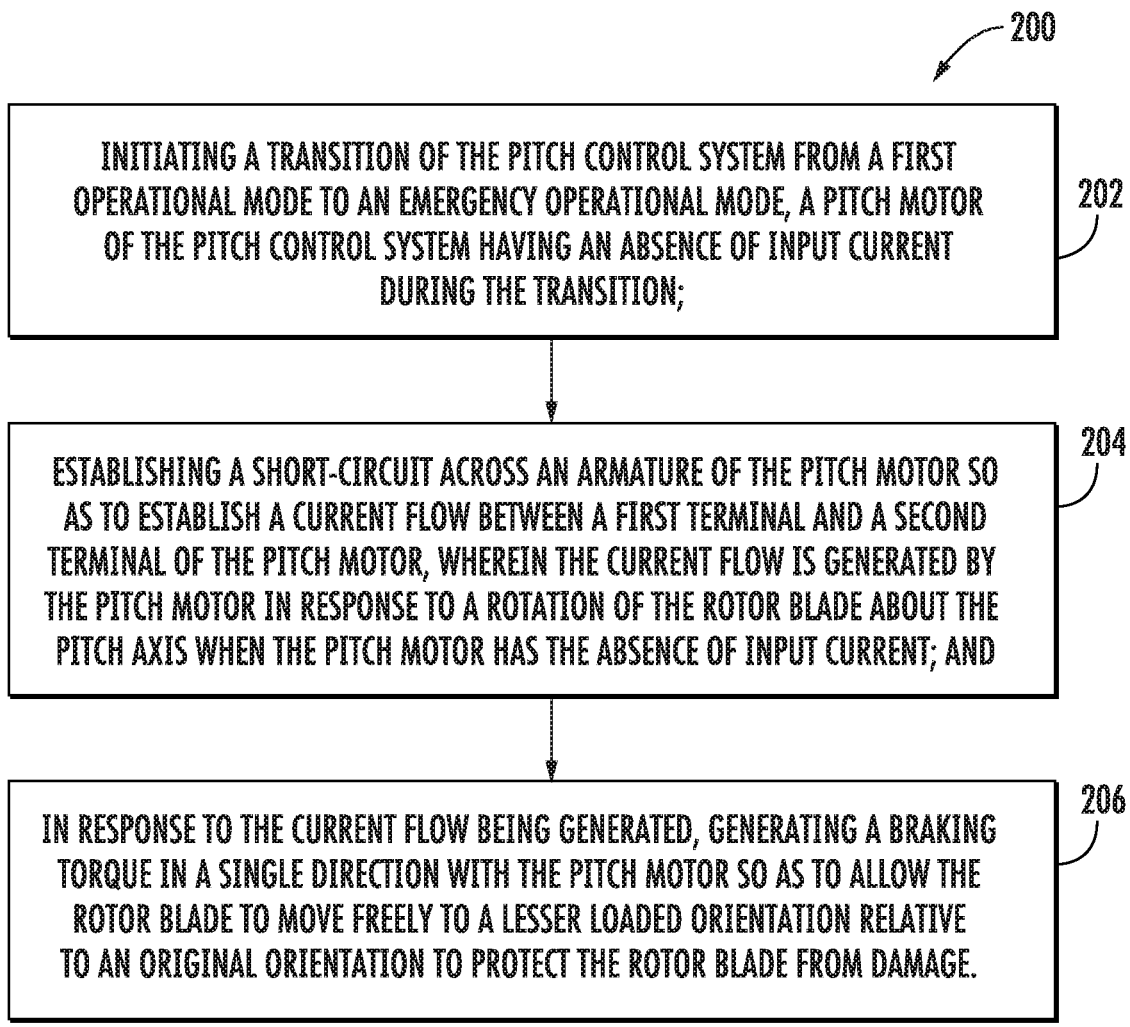
FIG. 5 illustrates a flow diagram of one embodiment of a method for applying a pitch motor braking torque to a rotor blade of a wind turbine according to the present disclosure.

Referring now to FIG. 5, a flow diagram of one embodiment of a method 200 for applying a pitch motor braking torque to a rotor blade of a wind turbine is illustrated. The method 200 may be implemented using, for instance, the pitch control system(s) 120 of the present disclosure discussed above with references to FIGS. 1-4. FIG. 5 depicts steps performed in a particular order for purposes of illustration and discussion. Those of ordinary skill in the art, using the disclosures provided herein, will understand that various steps of the method 200, or any of the methods disclosed herein, may be adapted, modified, rearranged, performed simultaneously, or modified in various ways without deviating from the scope of the present disclosure.

As shown at (202), the method 200 may include initiating a transition of the pitch control system from a first operational mode to an emergency operational mode. The pitch motor of the pitch control system may have an absence of supply current during the transition. As shown at (204), the method 200 may include establishing a short-circuit across an armature of the pitch motor so as to establish a current flow between a first terminal and a second terminal of the pitch motor. The current flow may be generated by the pitch motor in response to a rotation of the rotor blade about the pitch axis. In response to the current flow being generated, the method 200 may, as shown at (206), include generating a braking torque in a single direction with the pitch motor so as to allow the rotor blade to move freely to a lesser loaded orientation to protect the rotor blade from damage.

Figure 6:
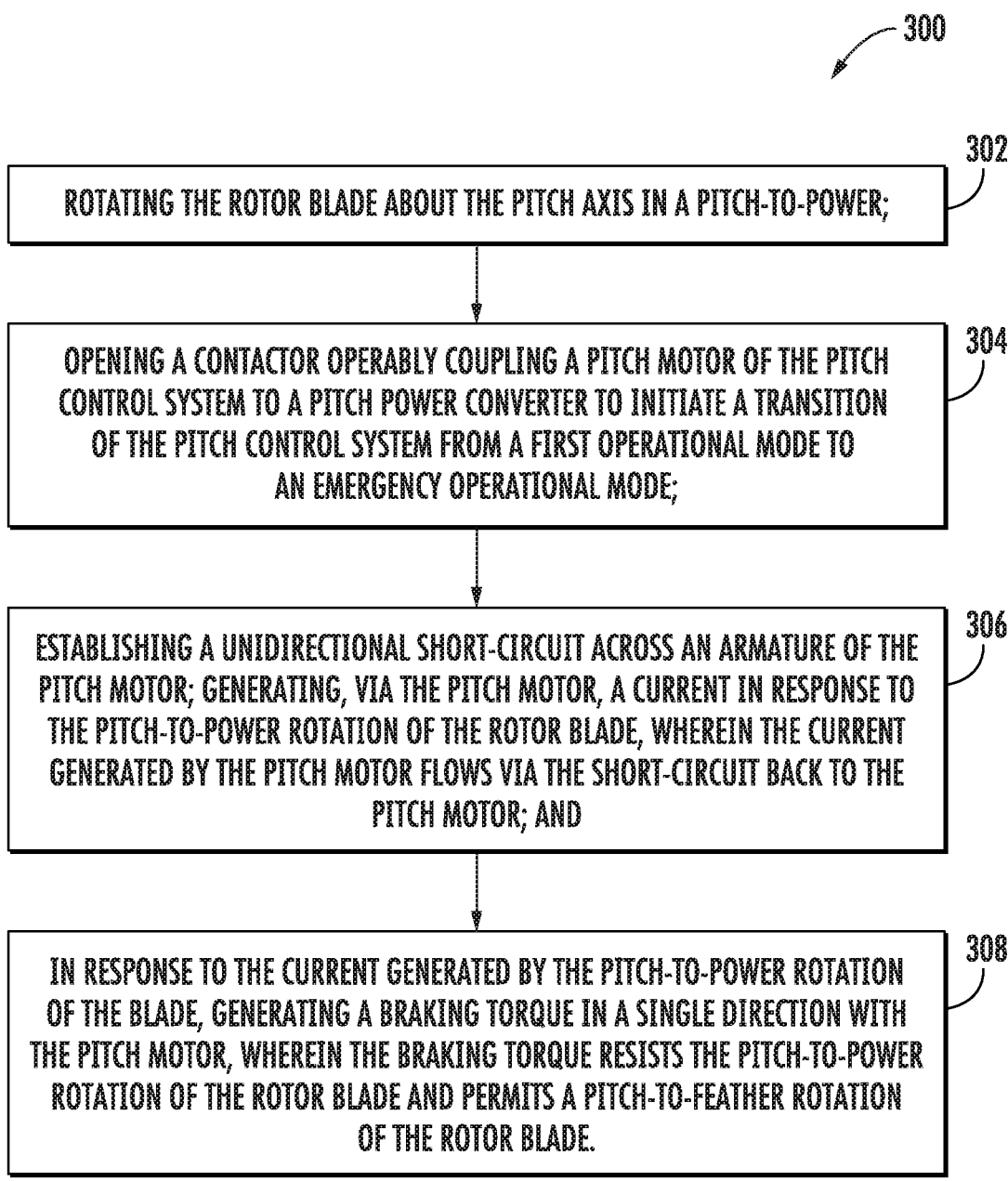
FIG. 6 illustrates a flow diagram of one embodiment of a method for applying a unidirectional pitch motor braking torque to a rotor blade of a wind turbine according to the present disclosure.

Referring now to FIG. 6, a flow diagram of another embodiment of a method 300 for applying a unidirectional pitch motor braking torque to a rotor blade of a wind turbine is illustrated. The method 300 may be implemented using, for instance, the pitch control system(s) 120 of the present disclosure discussed above with references to FIGS. 1-4. FIG. 6 depicts steps performed in a particular order for purposes of illustration and discussion. Those of ordinary skill in the art, using the disclosures provided herein, will understand that various steps of the method 300, or any of the methods disclosed herein, may be adapted, modified, rearranged, performed simultaneously, or modified in various ways without deviating from the scope of the present disclosure.

As shown at (302), the method 300 may include rotating the rotor blade about the pitch axis in a pitch-to-power. As shown at (304), the method 300 may include opening a contactor operably coupling the pitch motor of the pitch control system to the pitch power converter to initiate a transition of the pitch control mechanism from a first operational mode to an emergency operational mode. As shown at (306), the method 300 may include establishing a unidirectional short-circuit across an armature of the pitch motor. As shown at (308), the method 300 may include generating, via the pitch motor, a current in response to the pitch-to-power rotation of the rotor blade. The current generated by the pitch motor may flow via the short-circuit back to the pitch motor. In response to the current generated by the pitch-to-power rotation of the rotor blade, the method 300 may as shown at (310), include generating a braking torque in a single direction with the pitch motor. The braking torque resists the pitch-to-power rotation of the rotor blade and permits a pitch-to-feather rotation of the rotor blade.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for applying a pitch motor braking torque to a rotor blade of a wind turbine, the wind turbine having a pitch control system operably coupled to the rotor blade for rotating the rotor blade about a pitch axis, the method comprising: initiating a transition of the pitch control system from a first operational mode to an emergency operational mode, a pitch motor of the pitch control system having an absence of supply current during the transition; establishing a short-circuit across an armature of the pitch motor so as to establish a current flow between a first terminal and a second terminal of the pitch motor, wherein the current flow is generated by the pitch motor in response to a rotation of the rotor blade about the pitch axis when the pitch motor has the absence of supply current; and in response to the current flow being generated, generating a braking torque in a single direction with the pitch motor so as to allow the rotor blade to move freely to a lesser loaded orientation relative to an original orientation to protect the rotor blade from damage.

Clause 2. The method of any preceding claim, wherein the rotation of the rotor blade is a pitch-to-power rotation.

Clause 3. The method of any preceding claim, wherein generating the braking torque in the single direction resists the pitch-to-power rotation of the rotor blade, and wherein the movement to a lesser loaded orientation comprises a pitch-to-feather rotation of the rotor blade.

Clause 4. The method of any preceding claim, wherein establishing the short-circuit across the armature of the pitch motor further comprises blocking, via a unidirectional switch, the current flow path from the first terminal to the second terminal.

Clause 5. The method of any preceding claim, wherein initiating the transition of the pitch control system comprises opening a contactor operably coupling the pitch motor to a power converter of the pitch control system, wherein opening the contactor provides a signal to close the unidirectional switch.

Clause 6. The method of any preceding claim, wherein the unidirectional switch comprises an electro-mechanical switch.

Clause 7. The method of any preceding claim, wherein the unidirectional switch comprises an electronic switch.

Clause 8. The method of any preceding claim, wherein the electronic switch comprises a silicone controlled rectifier operably coupled to a gate driver circuit.

Clause 9. The method of any preceding claim, further comprising: completing the transition of the pitch control system from the first operational mode to the emergency operational mode by operably coupling the pitch motor to the alternate energy store.

Clause 10. The method of any preceding claim, wherein establishing the short-circuit across the armature of the pitch motor further comprises: operably coupling a first lead of a unidirectional switch to the first terminal of the pitch motor; and operably coupling a second lead of the unidirectional switch to a series field of the pitch motor, wherein coupling to the series field establishes a variable braking torque which increases with a torque resulting from the rotation of the rotor blade.

Clause 11. A pitch control system for applying a pitch motor braking torque to a rotor blade of a wind turbine, the pitch control system comprising: a pitch motor operably coupled to the rotor blade of the wind turbine, the pitch motor having an absence of supply current during a transition from a first operational mode of the pitch control system to an emergency operational mode of the pitch control system; a first coupling between the pitch motor and a pitch power converter when the pitch control system is in the first operational mode, wherein opening the first coupling initiates a transition of the pitch control system from the first operational mode to the emergency operational mode; a short-circuit across an armature of the pitch motor, wherein the short-circuit establishes a current flow between a first terminal and a second terminal of the pitch motor, wherein the current flow is generated by the pitch motor in response to a rotation of the rotor blade about the pitch axis when the pitch motor has the absence of supply current, wherein the pitch motor is configured to generate a braking torque in a single direction in response to the current generated by the rotation of the rotor blade, the braking torque permitting the rotor blade to move freely to a lesser loaded orientation to protect the rotor blade from damage; and a second coupling between the pitch motor and an alternate energy store when the pitch motor is in the emergency operational mode.

Clause 12. The system of any preceding claim, wherein the short-circuit further comprises a unidirectional switch operably coupled between the first terminal and the second terminal of the pitch motor, the unidirectional switch blocking a current flow path from the first terminal to the second terminal.

Clause 13. The system of any preceding claim, wherein the unidirectional switch comprises an electronic switch.

Clause 14. The system of any preceding claim, wherein the electronic switch comprises a silicone controlled rectifier operably coupled to a gate driver circuit.

Clause 15. The system of any preceding claim, wherein the first coupling is a first contactor operably coupling the silicone controlled rectifier to the alternate energy store upon the initiation of the transition of the pitch control system from the first operational mode to the emergency operational mode.

Clause 16. The system of any preceding claim, wherein the rotation of the rotor blade is a pitch-to-power rotation, wherein the braking torque resists the pitch-to-power rotation, and wherein the movement to a lesser loaded orientation is a pitch-to-feather rotation of the rotor blade.

Clause 17. A method for applying a unidirectional pitch motor braking torque to a rotor blade of a wind turbine, the wind turbine having a pitch control system operably coupled to the rotor blade for rotating the rotor blade about a pitch axis, the method comprising: rotating the rotor blade about the pitch axis in a pitch-to-power; opening a contactor operably coupling a pitch motor of the pitch control system to a pitch power converter to initiate a transition of the pitch control system from a first operational mode to an emergency operational mode; establishing a unidirectional short-circuit across an armature of the pitch motor; generating, via the pitch motor, a current in response to the pitch-to-power rotation of the rotor blade, wherein the current generated by the pitch motor flows via the short-circuit back to the pitch motor; and in response to the current generated by the pitch-to-power rotation of the rotor blade, generating a braking torque in a single direction with the pitch motor, wherein the braking torque resists the pitch-to-power rotation of the rotor blade and permits a pitch-to-feather rotation of the rotor blade.

Clause 18. The method of any preceding claim, wherein establishing the short-circuit further comprises: activating a unidirectional switch operably coupled between a first terminal and a second terminal of the pitch motor, the unidirectional switch blocking the current flow path from the first terminal to the second terminal.

Clause 19. The method of any preceding claim, wherein the unidirectional switch comprises a silicone controlled rectifier operably coupled to a gate driver circuit.

Clause 20. The method of any preceding claim, wherein opening the contactor operably couples the silicone controlled rectifier to the alternate energy store.

What is claimed is:

1. A method for applying a pitch motor braking torque to a rotor blade of a wind turbine, the wind turbine having a pitch control system operably coupled to the rotor blade for rotating the rotor blade about a pitch axis, the method comprising:
   initiating a transition of the pitch control system from a first operational mode to an emergency operational mode, a pitch motor of the pitch control system having an absence of supply current during the transition;
   establishing a short-circuit across an armature of the pitch motor so as to establish a current flow between a first terminal and a second terminal of the pitch motor, wherein the current flow is generated by the pitch motor in response to a rotation of the rotor blade about the pitch axis when the pitch motor has the absence of supply current; and
   in response to the current flow being generated, generating a braking torque in a single direction with the pitch motor so as to allow the rotor blade to move freely to a lesser loaded orientation relative to an original orientation to protect the rotor blade from damage.

2. The method of claim 1, wherein the rotation of the rotor blade is a pitch-to-power rotation.

3. The method of claim 2, wherein generating the braking torque in the single direction resists the pitch-to-power rotation of the rotor blade, and wherein the movement to a lesser loaded orientation comprises a pitch-to-feather rotation of the rotor blade.

4. The method of claim 3, wherein establishing the short-circuit across the armature of the pitch motor further comprises blocking, via a unidirectional switch, the current flow path from the first terminal to the second terminal.

5. The method of claim 4, wherein initiating the transition of the pitch control system comprises opening a contactor operably coupling the pitch motor to a power converter of the pitch control system, wherein opening the contactor provides a signal to close the unidirectional switch.

6. The method of claim 5, further comprising:
   completing the transition of the pitch control system from the first operational mode to the emergency operational mode by operably coupling the pitch motor to the alternate energy store.

7. The method of claim 4, wherein the unidirectional switch comprises an electro-mechanical switch.

8. The method of claim 4, wherein the unidirectional switch comprises an electronic switch.

9. The method of claim 8, wherein the electronic switch comprises a silicone controlled rectifier operably coupled to a gate driver circuit.

10. The method of claim 1, wherein establishing the short-circuit across the armature of the pitch motor further comprises:
    operably coupling a first lead of a unidirectional switch to the first terminal of the pitch motor; and
    operably coupling a second lead of the unidirectional switch to a series field of the pitch motor, wherein coupling to the series field establishes a variable braking torque which increases with a torque resulting from the rotation of the rotor blade.

11. A pitch control system for applying a pitch motor braking torque to a rotor blade of a wind turbine, the pitch control system comprising:
    a pitch motor operably coupled to the rotor blade of the wind turbine, the pitch motor having an absence of supply current during a transition from a first operational mode of the pitch control system to an emergency operational mode of the pitch control system;
    a first coupling between the pitch motor and a pitch power converter when the pitch control system is in the first operational mode, wherein opening the first coupling initiates a transition of the pitch control system from the first operational mode to the emergency operational mode;
    a short-circuit across an armature of the pitch motor, wherein the short-circuit establishes a current flow between a first terminal and a second terminal of the pitch motor, wherein the current flow is generated by the pitch motor in response to a rotation of the rotor blade about the pitch axis when the pitch motor the absence of supply current, wherein the pitch motor is configured to generate a braking torque in a single direction in response to the current generated by the rotation of the rotor blade, the braking torque permitting the rotor blade to move freely to a lesser loaded orientation to protect the rotor blade from damage; and
    a second coupling between the pitch motor and an alternate energy store when the pitch motor is in the emergency operational mode.

12. The system of claim 11, wherein the short-circuit further comprises a unidirectional switch operably coupled between the first terminal and the second terminal of the pitch motor, the unidirectional switch blocking a current flow path from the first terminal to the second terminal.

13. The system of claim 12, wherein the unidirectional switch comprises an electronic switch.

14. The system of claim 13, wherein the electronic switch comprises a silicone controlled rectifier operably coupled to a gate driver circuit.

15. The system of claim 14, wherein the first coupling is a first contactor operably coupling the silicone controlled rectifier to the alternate energy store upon the initiation of the transition of the pitch control system from the first operational mode to the emergency operational mode.

16. The system of claim 11, wherein the rotation of the rotor blade is a pitch-to-power rotation, wherein the braking torque resists the pitch-to-power rotation, and wherein the movement to a lesser loaded orientation is a pitch-to-feather rotation of the rotor blade.

17. A method for applying a unidirectional pitch motor braking torque to a rotor blade of a wind turbine, the wind turbine having a pitch control system operably coupled to the rotor blade for rotating the rotor blade about a pitch axis, the method comprising:
rotating the rotor blade about the pitch axis in a pitch-to-power;
opening a contactor operably coupling a pitch motor of the pitch control system to a pitch power converter to initiate a transition of the pitch control system from a first operational mode to an emergency operational mode;
establishing a unidirectional short-circuit across an armature of the pitch motor;
generating, via the pitch motor, a current in response to the pitch-to-power rotation of the rotor blade, wherein the current generated by the pitch motor flows via the short-circuit back to the pitch motor; and
in response to the current generated by the pitch-to-power rotation of the rotor blade, generating a braking torque in a single direction with the pitch motor, wherein the braking torque resists the pitch-to-power rotation of the rotor blade and permits a pitch-to-feather rotation of the rotor blade.

18. The method of claim 17, wherein establishing the short-circuit further comprises:
activating a unidirectional switch operably coupled between a first terminal and a second terminal of the pitch motor, the unidirectional switch blocking the current flow path from the first terminal to the second terminal.

19. The method of claim 18, wherein the unidirectional switch comprises a silicone controlled rectifier operably coupled to a gate driver circuit.

20. The method of claim 19, wherein opening the contactor operably couples the silicone controlled rectifier to an alternate energy store.

* * * * *